US008181726B2

(12) United States Patent
Reuter et al.

(10) Patent No.: US 8,181,726 B2
(45) Date of Patent: May 22, 2012

(54) VEHICLE HAVING AT LEAST ONE ELECTRIC MACHINE WHICH CAN BE OPERATED AS A GENERATOR

(75) Inventors: Uwe Reuter, Althengsteet (DE); Rainer Wuest, Wiernsheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 234 days.

(21) Appl. No.: 12/464,539

(22) Filed: May 12, 2009

(65) Prior Publication Data

US 2010/0025135 A1    Feb. 4, 2010

(30) Foreign Application Priority Data

Aug. 4, 2008   (DE) .......................... 10 2008 036 281

(51) Int. Cl.
*B60W 10/04* (2006.01)
(52) U.S. Cl. ............. 180/65.285; 180/65.22; 180/65.25; 180/65.31; 903/906; 903/947
(58) Field of Classification Search ............. 180/65.285, 180/65.22, 65.25, 65.31; 903/906, 947; 701/70
See application file for complete search history.

(56) References Cited

U.S. PATENT DOCUMENTS

| | | | |
|---|---|---|---|
| 4,962,969 A * | 10/1990 | Davis ................................ 303/3 |
| 6,719,076 B1 * | 4/2004 | Tabata et al. .................. 180/65.7 |
| 7,104,617 B2 * | 9/2006 | Brown ........................... 303/152 |
| 7,267,191 B2 * | 9/2007 | Xu et al. .................... 180/65.245 |
| 7,925,411 B2 * | 4/2011 | Fuhrer et al. ..................... 701/81 |
| 2001/0020554 A1 * | 9/2001 | Yanase et al. ................ 180/65.3 |
| 2002/0014872 A1 | 2/2002 | Morimoto et al. |
| 2003/0205930 A1 * | 11/2003 | Smart .............................. 303/20 |
| 2005/0151420 A1 * | 7/2005 | Crombez et al. ............... 303/152 |
| 2006/0064225 A1 * | 3/2006 | Tabata et al. ..................... 701/96 |
| 2006/0266568 A1 * | 11/2006 | Barske .......................... 180/65.2 |
| 2008/0315681 A1 * | 12/2008 | Waldenmeier et al. ........ 303/152 |
| 2008/0315814 A1 | 12/2008 | Takizawa et al. |
| 2009/0051304 A1 | 2/2009 | Muta |

FOREIGN PATENT DOCUMENTS

| | | |
|---|---|---|
| DE | 10 2006 019 494 A1 | 10/2007 |
| DE | 10 2006 034 936 A1 | 1/2008 |
| JP | 6166573 | 5/1986 |
| JP | 2008154324 | 7/2008 |

OTHER PUBLICATIONS

Ito et al., Braking Apparatus of industrial Electric Drive Vehicle, Jul. 3, 2008, JPO, JP 2008-154324 A, English Abstract.*
Ito et al., Braking Apparatus of industrial Electric Drive Vehicle, Jul. 3, 2008, JPO, JP 2008-154324 A, Machine translation of Description.*

* cited by examiner

*Primary Examiner* — Toan C To
*Assistant Examiner* — James English
(74) *Attorney, Agent, or Firm* — Gerald E. Hespos; Michael J. Porco

(57) ABSTRACT

A vehicle has at least one electric machine that can be operated as a generator, an electrical energy accumulator and a control unit for controlling the at least one electric machine and the electrical energy accumulator. The control unit operates so that in a recovery phase the vehicle can be decelerated by the generator load of the electric machine operated as a generator (2:*a*) and the resulting electrical energy (1:E) can be stored in the electrical energy accumulator. The control unit is configured so that the at least one electric machine operated as a generator in a recovery phase is operated by said control unit in a chronologically unlimited fashion with a predefinable overload (2':*a*, 2":*a*, 2"':*a*).

8 Claims, 3 Drawing Sheets

VEHICLE HAVING AT LEAST ONE ELECTRIC MACHINE WHICH CAN BE OPERATED AS A GENERATOR

This application claims priority under 35 USC 119 to German Patent Application No. 10 2008 036 281.6 filed on Aug. 4, 2008, the entire disclosure of which is incorporated herein by reference.

BACKGROUND OF THE INVENTION

1. Field of the Invention

The invention relates to a vehicle having at least one electric machine that can be operated as a generator. In this context, the term vehicle refers to a non-track-bound vehicle, and particularly a road vehicle.

2. Description of the Related Art

Vehicles, such as hybrid vehicles or electric vehicles, have one or more electric machines with different operating modes that function in view of respective operating situations of the vehicle. For example, at least one electric machine can be operated as a motor to provide at least additional drive for the vehicle. Full hybrid vehicles and electric vehicles are driven exclusively, at least for a certain time, by the electric machine. However, the electric machine of mild hybrid vehicles only provide a supplementary drive for the vehicle in addition to an internal combustion engine. A supply of electrical energy from a vehicle-mounted electrical energy accumulator is provided when an electric machine is operated as a motor. The electrical energy accumulator may be a lithium-ion high voltage battery. The drive power achieved by operating the electric machine as a motor depends on the size of the electric machine. For example, good drive power is necessary to drive a heavy vehicle, and as a result heavy electric machines have been considered necessary for a heavy vehicle. WO 2007/125743 proposes that a motor for driving a vehicle should be operated at overload to avoid using a heavy electric machine as a motor. However, an overload can damage the electric machine, and complex means for monitoring the temperature or time period of the motor are necessary in the overload mode.

An electric machine also customarily must be operated as a generator in hybrid or electric vehicles in addition to being operated as a motor. In this context, serial hybrid drives or power-split hybrid drives have drive arrangements with separate electric machines for the operating mode as a generator or as a motor. Parallel hybrid drives provide drive arrangements in which the same electric machine is operated either as a motor or as a generator. An electric machine must be operated if the electrical energy accumulator no longer contains sufficient electrical energy to supply electrical energy to the motor to drive the vehicle. In such cases, the internal combustion engine of a hybrid engine is activated to drive the vehicle and/or to operate the generator to charge the electrical energy accumulator with electrical energy.

An electric machine frequently is operated as a generator to recover kinetic energy from the traveling vehicle. As a result of the generator load which is applied when the electric machine is operating as a generator, the vehicle is braked and the resulting energy is converted at least partially into electrical energy. This electrical energy then is stored in the electrical energy accumulator and can be used again, for example, to drive the vehicle. Therefore, an electric machine is operated as a generator without the internal combustion engine having to be activated during recovery in a hybrid vehicle. To recover the kinetic energy of the vehicle as well as possible, the driver of the vehicle implements a deceleration request and at least one electric machine operates as a generator if this requested deceleration can be made available by the generator load that comes about. The service brake of the vehicle is not activated, and kinetic energy of the vehicle is converted into heat, until the requested deceleration is greater than the deceleration that can be made available by operating the electric machine as a generator. A vehicle with these features is described generally in DE 10 2006 034 936.

An object of the invention is to improve the vehicle disclosed generically in DE 10 2006 034 936.

SUMMARY OF THE INVENTION

The invention relates to a control unit configured to operate at least one electric machine as a generator in a chronologically unlimited fashion with a predefinable overload if the vehicle is in a recovery phase. The invention is based on the realization that there is no need for a complex control of the timing or temperature of the electric machine when the electric machine is operated as a generator in an overload mode during a recovery phase of the vehicle. More particularly, the operation of an electric machine as a generator during a recovery phase of the vehicle is characterized in that the vehicle is braked by the generator load that occurs. Therefore, the overload mode persists only for a limited time, and specifically at maximum up to the stationary state of the vehicle or up to the end of the recovery phase. In other words, in a recovery phase of the vehicle, a vehicle dynamic time limitation of the overload mode of the electric machine is implemented. This is because the vehicle is braked by the generator load and as a result the overload of the electric machine operated as a generator is reduced quasi-automatically. Accordingly, there is then no need for complex timing control or temperature control of the electric machine in the recovery mode since this control is implemented through vehicle dynamics. An overload mode of the electric machine is thus possible without complex control or monitoring by virtue of the fact that the overload is a value that can be predefined in accordance with the dynamic conditions of the vehicle. The control unit merely needs to ensure that the overload mode of the electric machine that is operated as a generator is provided only in recovery phases. In this context, one or more electric machines can be operated as a generator in a chronologically unlimited fashion with a predefinable overload in a recovery phase as a function of a respective vehicle configuration, and, in this context, the respective overload of different electric machines may also be provided in different ways.

The value that can be predefined for the overload preferably is approximately 30 to 50% above the value of the rated load of an electric machine. Therefore, the vehicle can be braked reliably to a standstill by the generator load in a recovery phase without the electric machine being damaged. In this context, the overload may be predefined in a permanent or variable fashion. For example, the value of the predefinable overload can be predefined as a function of the instantaneous speed of the vehicle, the current temperature of the electrical energy accumulator and/or the state of charge (SOC) of the electrical energy accumulator. In this context, further closed-loop control or monitoring of the electric machine is not necessary in any case, instead all that is necessary to ensure is that the overload occurs only when the electric machine is operating as a generator in a recovery phase of the vehicle.

A vehicle-mounted operator control element preferably is provided for triggering a recovery phase to permit the driver of the vehicle to carry out appropriate control. The driver of the vehicle triggers the recovery phase by inputting a desired deceleration by means of the operator control element. Activating the operator control element causes at least one electric machine to be operated as a generator with a predefinable overload in order to brake the vehicle. The electrical energy produced by the generator load is stored in the electrical energy accumulator. A recovery phase also may be initiated automatically, for example, in a way that is analogous to a conventional motor brake when neither the brake pedal nor the accelerator pedal is activated while the vehicle is traveling.

The operator control element preferably is a brake pedal. The control unit sets the generator load of an electric machine operated as a generator in a recovery phase, as a function of the position of the brake pedal at least in certain areas up to the predefinable overload. This permits optimum recovery of kinetic energy stored in the traveling vehicle in that the generator load is provided in accordance with a deceleration desired by the driver of the vehicle. In this context, the predefinable overload constitutes a maximum limit up to which the vehicle can be braked by means of the electric machine that is operated as a generator. A correspondingly lower generator load may be set if the value of the deceleration desired by the driver of the vehicle turns out to be lower, thereby permitting a maximum proportion of the kinetic energy to be recovered.

The brake pedal may actuate a directly coupled brake system of the vehicle. In this embodiment, the control unit is configured to set the generator load of at least one electric machine that is operated as a generator in a recovery phase up to the predefinable overload in a first activation range of the brake pedal, and to apply service brakes of the vehicle in a second activation range of the brake pedal. This constitutes a simple way of modifying a coupled, conventional brake system of a vehicle in which the generator load simply is added in the first range of activation of the brake pedal. In this first range of activation of the brake pedal, there preferably is still no actuation of the service brakes of the vehicle. Thus, the greatest possible proportion of kinetic energy can be recovered.

In an alternate embodiment of the invention, the brake pedal may actuate a superimposition brake system. In this embodiment, the control unit is configured to set the generator load up to the predefinable overload and to apply a possibly necessary remaining deceleration component by means of service brakes of the vehicle. Such superimposition brake systems, for example electro-hydraulic brake systems, decouple the activation of the brake pedal from the actual service brake and therefore permit flexible, i.e. situation-dependent, division of the desired deceleration between the electric machine operated as a generator and the service brake. In this context, the electric machine that is operated as a generator always is actuated up to the predefinable overload in a recovery phase. If this generator load is not sufficient to implement a deceleration desired by the driver of the vehicle, a possibly still necessary residual component of deceleration is made available by the service brake. The recovery is supported in the best possible way by the overload mode of the electric machine as a generator, which is limited chronologically in terms of vehicle dynamics, without a correspondingly large and heavy electric machine being necessary.

The vehicle preferably is a torque-adding parallel hybrid, wherein an electric machine drives the vehicle together with an internal combustion engine so that the rotational speeds of the electric machine and internal combustion engine are coupled permanently to one another. The torque, i.e. the load, on the electric machine and on the internal combustion engine can be set independently of one another in the torque-adding parallel hybrid. Thus, a particularly simple way of implementing the overload mode of the invention in a recovery phase is obtained. The parallel hybrid can be a single-shaft or multi-shaft hybrid.

The inventive operation of the electric machine as a generator with a predefinable overload makes available a relatively large amount of electrical energy in recovery phases of the vehicle. This electrical energy preferably is stored in the electrical energy accumulator, for example the high voltage battery. If the quantity of electrical energy exceeds the capacity of the high voltage battery, this electrical energy can be used elsewhere in the vehicle. For example, the excess electrical energy can be stored in the low voltage on-board power system battery by means of the existing DC/DC converter. Alternatively or additionally, storage in high performance capacitors (ultracaps) may be provided. Alternatively or additionally, this electrical energy may be converted into other forms of energy, for example into hydraulic pressure in a hydraulic accumulator. Such a hydraulic accumulator may be embodied here as a component of another vehicle component, for example a roll stabilizer or a closed center steering system. Alternatively or additionally, further electrical consumers in the vehicle may be actuated, for example an engine compartment fan, an engine cooling water heating system or an exhaust gas post-treatment system heating system.

The invention will now be explained in more detail with reference to the drawings.

DETAILED DESCRIPTION OF THE PREFERRED EMBODIMENT

Figure 1:
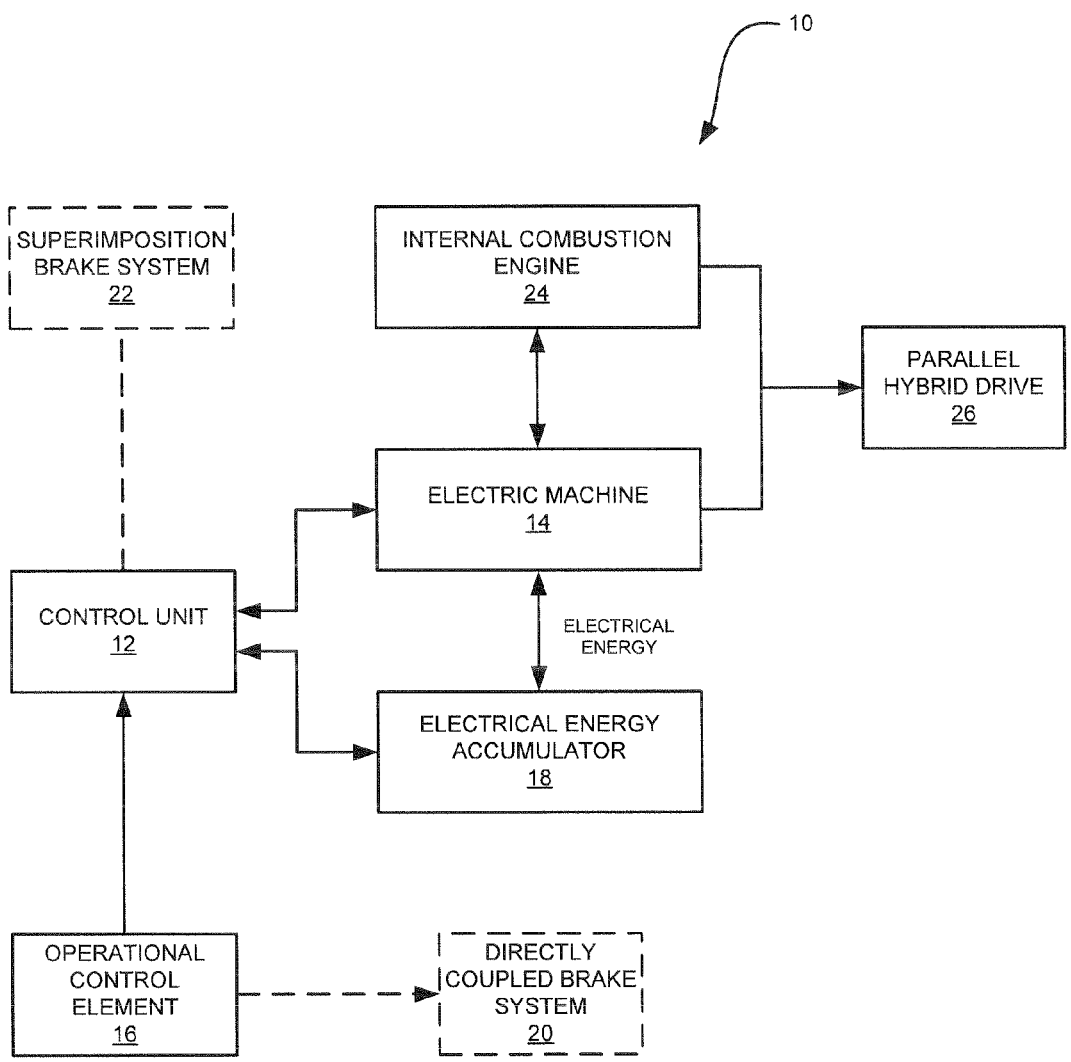
FIG. 1 is block diagram of a vehicle having at least one electric machine that can be operated as a generator in accordance with an embodiment of the present invention.

Referring to FIG. 1, the invention relates to a vehicle 10 having a control unit 12 configured to operate at least one electric machine 14 as a generator in a chronologically unlimited fashion with a predefinable overload if the vehicle 10 is in a recovery phase. The invention is based on the realization that there is no need for a complex control of the timing or temperature of the electric machine 14 when the electric machine 14 is operated as a generator in an overload mode during a recovery phase of the vehicle. More particularly, the operation of an electric machine 10 as a generator during a recovery phase of the vehicle is characterized in that the vehicle is braked by the generator load that occurs.

A vehicle-mounted operator control element 16 preferably is provided for triggering a recovery phase to permit the driver of the vehicle to carry out appropriate control. The driver of the vehicle triggers the recovery phase by inputting a desired deceleration by means of the operator control element 16. Activating the operator control element 16 causes at least one electric machine 14 to be operated as a generator with a predefinable overload in order to brake the vehicle. The electrical energy produced by the generator load is stored in the electrical energy accumulator 18. A recovery phase also may be initiated automatically, for example, in a way that is analogous to a conventional motor brake when neither the brake pedal nor the accelerator pedal is activated while the vehicle is traveling.

The operator control element 16 preferably is a brake pedal. The control unit 12 sets the generator load of an electric machine 14 operated as a generator in a recovery phase, as a function of the position of the brake pedal at least in certain areas up to the predefinable overload. This permits optimum recovery of kinetic energy stored in the traveling vehicle in that the generator load is provided in accordance with a deceleration desired by the driver of the vehicle. In this context, the predefinable overload constitutes a maximum limit up to which the vehicle can be braked by means of the electric machine that is operated as a generator. A correspondingly lower generator load may be set if the value of the deceleration desired by the driver of the vehicle turns out to be lower, thereby permitting a maximum proportion of the kinetic energy to be recovered.

The brake pedal may actuate a directly coupled brake system 20 of the vehicle 10. In this embodiment, the control unit 12 is configured to set the generator load of at least one electric machine 14 that is operated as a generator in a recovery phase up to the predefinable overload in a first activation range of the brake pedal, and to apply service brakes of the vehicle in a second activation range of the brake pedal. This constitutes a simple way of modifying a coupled, conventional brake system of a vehicle in which the generator load simply is added in the first range of activation of the brake pedal. In this first range of activation of the brake pedal, there preferably is still no actuation of the service brakes of the vehicle. Thus, the greatest possible proportion of kinetic energy can be recovered.

In an alternate embodiment of the invention, the brake pedal may actuate a superimposition brake system 22. In this embodiment, the control unit 12 is configured to set the generator load up to the predefinable overload and to apply a possibly necessary remaining deceleration component by means of service brakes of the vehicle. Such superimposition brake systems 22, for example electro-hydraulic brake systems, decouple the activation of the brake pedal from the actual service brake and therefore permit flexible, i.e. situation-dependent, division of the desired deceleration between the electric machine operated as a generator and the service brake. In this context, the electric machine that is operated as a generator always is actuated up to the predefinable overload in a recovery phase. If this generator load is not sufficient to implement a deceleration desired by the driver of the vehicle, a possibly still necessary residual component of deceleration is made available by the service brake. The recovery is supported in the best possible way by the overload mode of the electric machine as a generator, which is limited chronologically in terms of vehicle dynamics, without a correspondingly large and heavy electric machine being necessary.

The vehicle preferably is a torque-adding parallel hybrid, wherein an electric machine 14 drives the vehicle 10 together with an internal combustion engine 24 so that the rotational speeds of the electric machine 14 and internal combustion engine 24 are coupled permanently to one another to define a torque-adding parallel hybrid drive 26. The torque, i.e. the load, on the electric machine and on the internal combustion engine can be set independently of one another in the torque-adding parallel hybrid. Thus, a particularly simple way of implementing the overload mode of the invention in a recovery phase is obtained. The parallel hybrid can be a single-shaft or multi-shaft hybrid.

Figure 2:
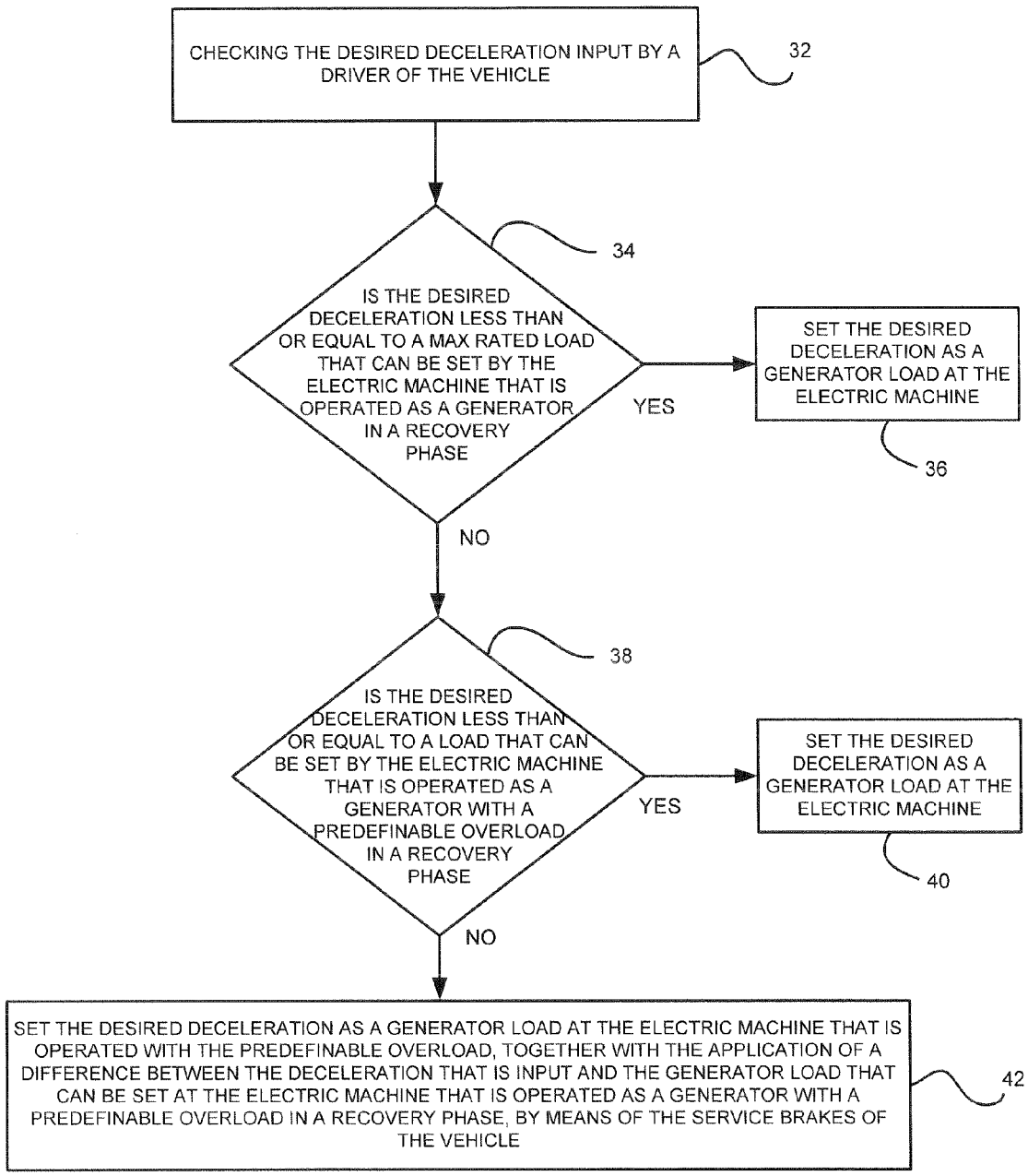
FIG. 2 is a flowchart illustrating a method of the present invention.

Referring to FIG. 2, a method for decelerating a vehicle that has at least one electric machine that can be operated as a generator, a service brake and an operator control element for inputting a desired deceleration is illustrated. Initially, at step 32, the desired deceleration input by a driver of the vehicle is checked by the control unit 12 and, based on the desired deceleration, a setting step is performed. At step 34, the control unit 12 determines if the desired deceleration is less than or equal to a maximum rated load that can be set by the electric machine that is operated as a generator in a recovery phase, and if so, the control unit 12 sets the desired deceleration as a generator load at the electric machine, in step 36. Otherwise, at step 38, the control unit 12 determines if the desired deceleration is less than or equal to a load that can be set by the electric machine that is operated as a generator with a predefinable overload in a recovery phase, and if so, the control unit 12 sets the desired deceleration as a generator load at the electric machine, in step 40. If neither of the condition exists at steps 34 and 37, the control unit 12 sets the desired deceleration as a generator load at the electric machine that is operated with the predefinable overload, together with the application of a difference between the deceleration that is input and the generator load that can be set at the electric machine that is operated as a generator with a predefinable overload in a recovery phase, by means of the service brakes of the vehicle.

Figure 3:
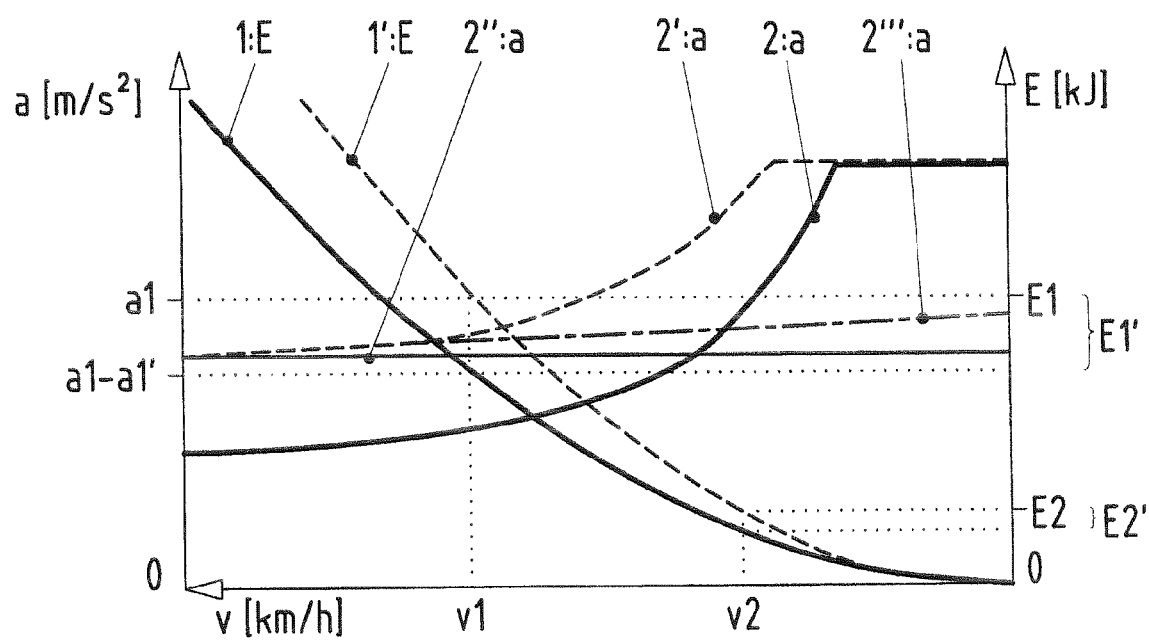
FIG. 3 is a diagram showing the maximum quantity of electrical energy "E" produced or maximum vehicle deceleration "a" generated at a respective velocity "v" of the vehicle when an electric machine is operated at rated load or with overload as a generator in a recovery phase of a vehicle.

The maximum (recoverable) quantity of electrical energy which is produced by the generator load of an electric machine at a respective velocity v of the vehicle is illustrated by way of example in FIG. 3, plotted on the right-hand ordinate. Curve 1:E illustrates the maximum recoverable quantity of electrical energy at rated load, and curve 1':E illustrates the maximum recoverable quantity of electrical energy when a predefinable overload of the electric machine occurs. Generally, it is firstly apparent from curves 1:E, 1':E that at higher vehicle velocities a significantly larger quantity of energy can be recovered than at relatively low velocities. A large and therefore heavy electric machine has been considered necessary to utilize a recoverable quantity of energy fully in high speed vehicles. However, the invention avoids the need for a large heavy machine by operating an electric machine as a generator in a recovery phase with overload to obtain a larger quantity of electrical energy to be recovered than at rated load. The overload mode of an electric machine achieves the same effect in a recovery phase as would be achieved by using a relatively large and a relatively heavy electric machine. Furthermore, the chronological limiting of the overload mode, implemented by vehicle dynamics, removes the need for any complex control of the timing or temperature of the electric machine in the overload mode. Instead, the overload is reduced quasi-automatically ever further by the braking of the vehicle on the basis of the generator load.

The example illustrated in FIG. 3 demonstrates that in the overload mode a quantity of energy of E1 can be recovered at a velocity of the vehicle of v1 and a quantity of energy of E2 can be recovered at a velocity of v2. A proportion of E1' and respectively E2' of each of these is due to the overload mode, i.e. in the rated load mode only a quantity of energy of E1-E1' and respectively E2-E2' can be recovered. At only half the velocity v2=½*v1, only a significantly lower quantity of energy E2'<½*E1' can then be recovered on the basis of the overload mode. The predefinable overload of the electric machine during operation as a generator in a recovery phase of a vehicle is reduced automatically by vehicle dynamics, therefore avoiding damage to the electric machine.

Operating an electric machine with overload results in a higher generator load, a greater amount of recovered energy and also a larger braking deceleration of the vehicle. This is illustrated schematically by means of curves 2:a and 2':a. The curve 2:*a* shows the deceleration of the vehicle by means of the generator load at rated load of the electric machine that is operated as a generator, and the curve 2':*a* shows the deceleration of the vehicle by the generator load at predefinable overload. At the velocity v1, a maximum deceleration a1 at overload, plotted on the left-hand ordinate, can be implemented instead of a deceleration a1-a1' at rated load. In the overload mode it is therefore still possible to implement higher decelerations of the vehicle, desired by the driver, by means of a generator load than in the rated load mode.

A braking deceleration that rises non-linearly according to curve 2':*a* would be obtained with a permanently predefinable overload at a decreasing velocity of the vehicle if the maximum possible deceleration were to be implemented in a recovery phase. However, this "sucking" braking with a constant position of the pedal takes some time for the driver of the vehicle to get used to and/or is uncomfortable. The overload therefore preferably can be predefined in a variable fashion as a function of the instantaneous velocity of the vehicle. The predefinable overload of the electric machine therefore is reduced in the mode as a generator in a recovery phase of the vehicle as the velocity of the vehicle decreases. The driver of the vehicle is given a good impression of deceleration when there is a linear, horizontal characteristic curve according to the curve 2":*a*. A slightly rising linear characteristic curve 2''':*a* also is possible.

The illustrated values should merely be understood as being schematic here and they depend in particular on the type of electric machine used, the number of machines and the weight of the vehicle. In this context, the invention can be used in a large number of different vehicles, with one or more electric machines that can be operated as a generator. It is therefore possible, for example, to provide one electric machine per wheel or per axle of the vehicle. Furthermore, one or more electric machines can act, for example by means of summing gears, on a plurality of axles or wheels of the vehicle. In all cases, an overload mode of the electric machine, or of each electric machine, which can be operated as a generator is provided only in a recovery phase of the vehicle, with the vehicle dynamics ensuring that the electric machine, or each electric machine, is protected against damage.

What is claimed is:

1. A vehicle having at least one electric machine that can be operated as a generator, service brakes, an electrical energy accumulator, a control unit for controlling the at least one electric machine and the electrical energy accumulator, so that in a recovery phase the vehicle can be decelerated by a generator load of the at least one electric machine operated as the generator and resulting electrical energy can be stored in the electrical energy accumulator and a vehicle mounted operator control element for inputting to the control unit a desired deceleration and for triggering the recovery phase, the control unit being configured so that the at least one electric machine that is operated as the generator in the recovery phase is operated by said control unit in a chronologically unlimited fashion with a predefinable overload, and the control unit further being configured to actuate the service brakes of the vehicle if the predefinable overload of the at least one electric machine operated as a generator is determined to be insufficient to implement the desired deceleration that has been inputted from the vehicle mounted operator control element to the control unit.

2. The vehicle of claim 1, wherein the predefinable overload is approximately 30 to 50% above a rated load of the at least one electric machine that is operated as a generator.

3. The vehicle of claim 1, wherein the operator control element is a brake pedal, and wherein the control unit is configured to set the generator load of the at least one electric machine operated as the generator in the recovery phase as a function of a position of the brake pedal at least in certain areas, and in accordance with the desired deceleration.

4. The vehicle of claim 3, further comprising a directly coupled brake system actuated by the brake pedal, and the control unit being configured to set the generator load up to the predefinable overload in a first activation range of the brake pedal, and to apply the service brakes of the vehicle in a second activation range of the brake pedal.

5. The vehicle of claim 3, further comprising a superimposition brake system actuated by the brake pedal, and the control unit being configured to set the generator load up to the predefinable overload and to apply a possibly necessary remaining deceleration component by the service brakes of the vehicle.

6. The vehicle of claim 1, wherein the electric machine can optionally be operated as a motor or as the generator, and is operative to drive the vehicle, together with an internal combustion engine, rotational speeds of the electric machine and of the internal combustion engine being coupled permanently to one another to define a torque-adding parallel hybrid drive.

7. A method for decelerating a vehicle that has at least one electric machine that can be operated as a generator, a service brake and an operator control element for inputting a desired deceleration, the method comprising:
checking the desired deceleration input by a driver of the vehicle; and performing a setting step selected from:
setting the desired deceleration as a generator load at the electric machine if the desired deceleration is less than or equal to a load that can be set by the electric machine that is operated as the generator with a predefinable overload and without a chronological limitation in a recovery phase; and
setting the desired deceleration as a generator load at the electric machine that is operated with the predefinable overload and without the chronological limitation, together with the application of a difference between the deceleration that is input and the generator load that can be set at the electric machine that is operated as the generator with a predefinable overload in a recovery phase, by means of the service brakes of the vehicle.

8. The method of claim 7, wherein the predefinable overload of the electric machine that is operated as the generator in the recovery phase is approximately 30 to 50% above a rated load.

* * * * *